INVENTOR.
GEORGE R. JESSEN
CARL W. CHANLUND
BY Lyon & Lyon
ATTORNEYS

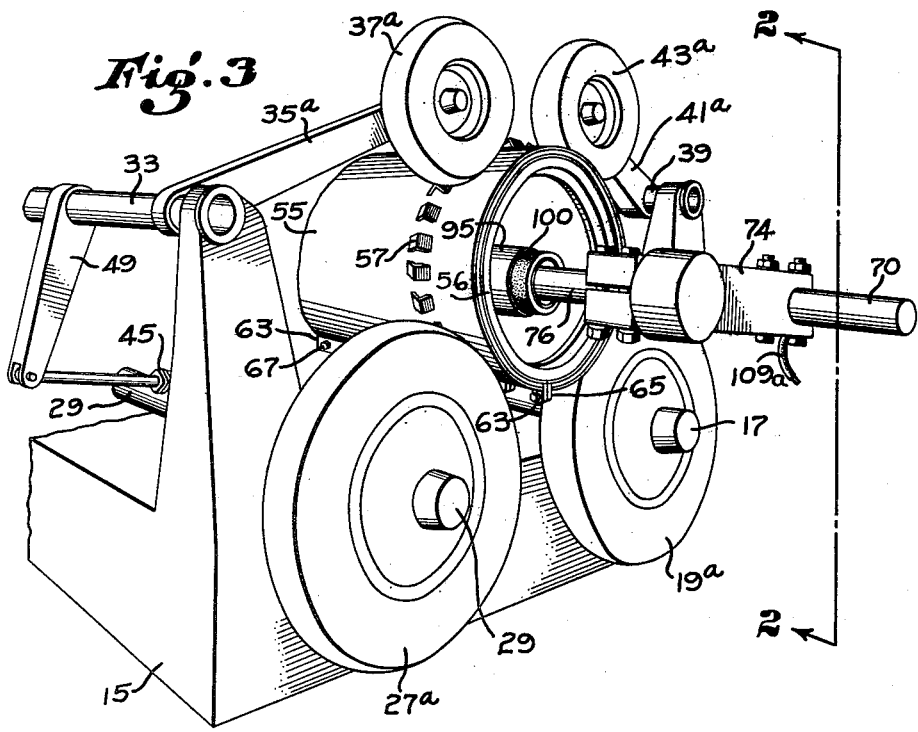
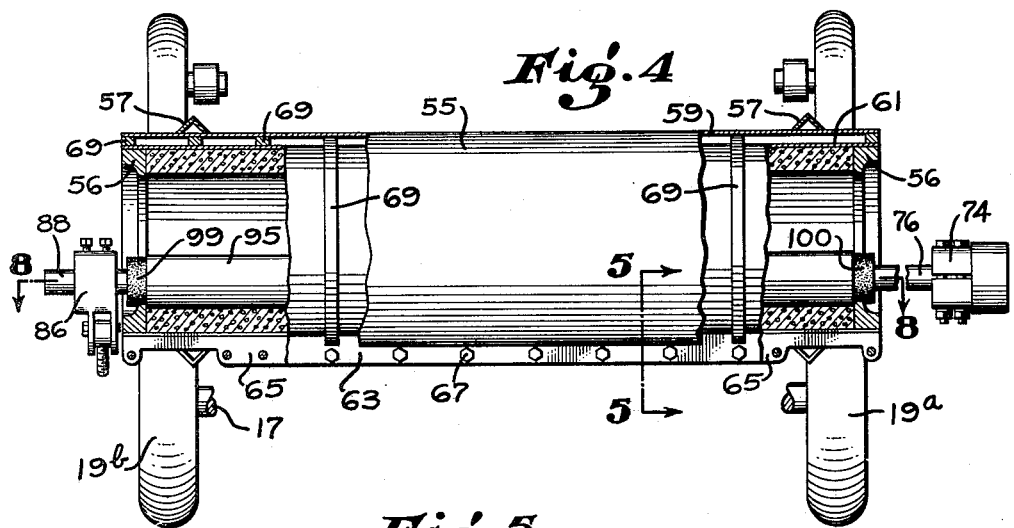
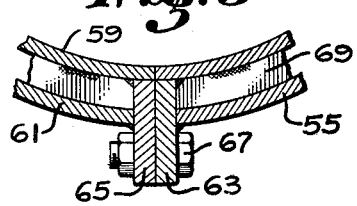

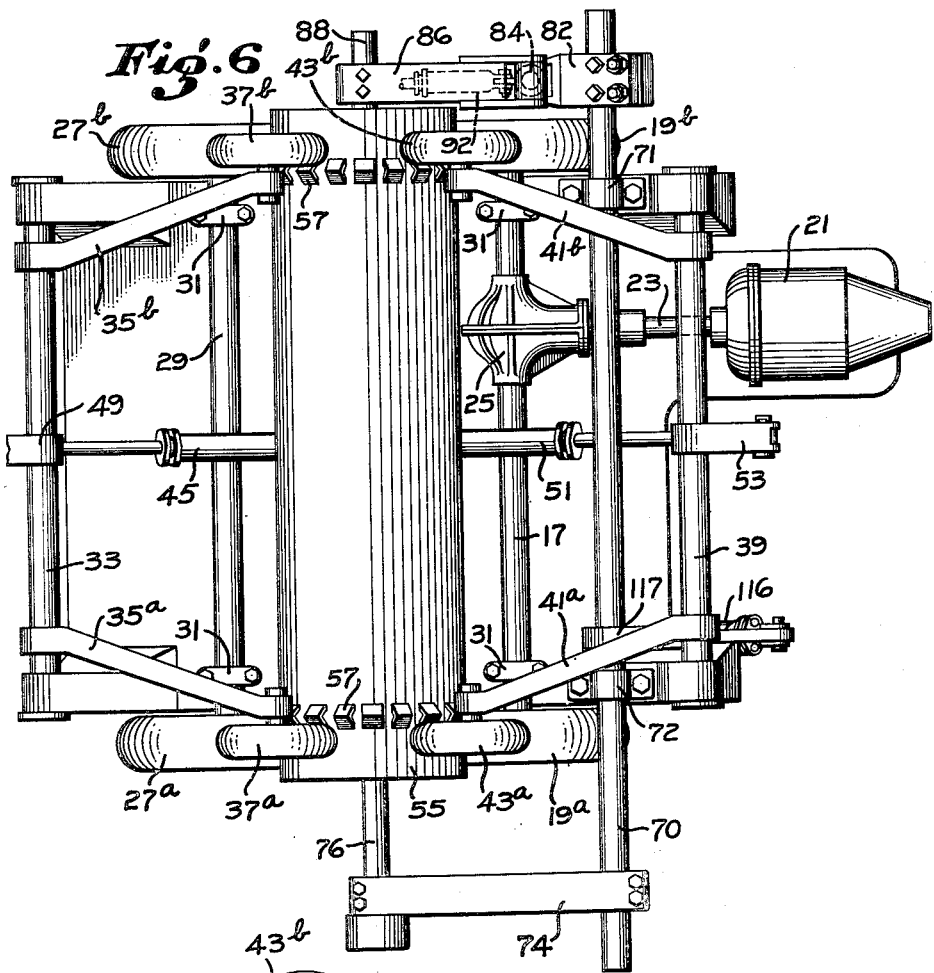
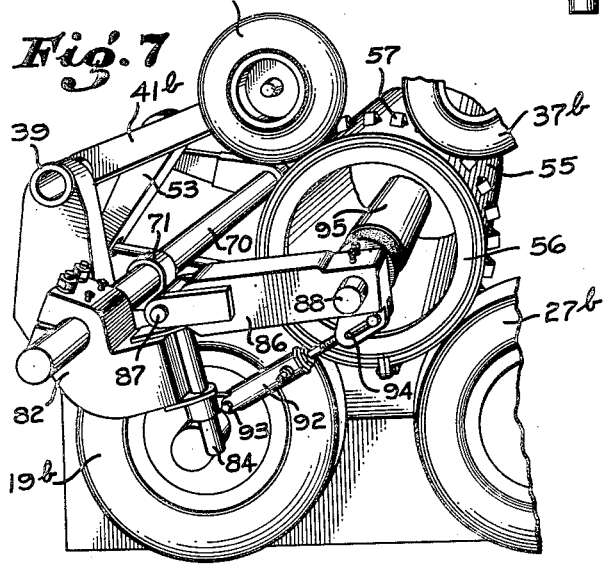

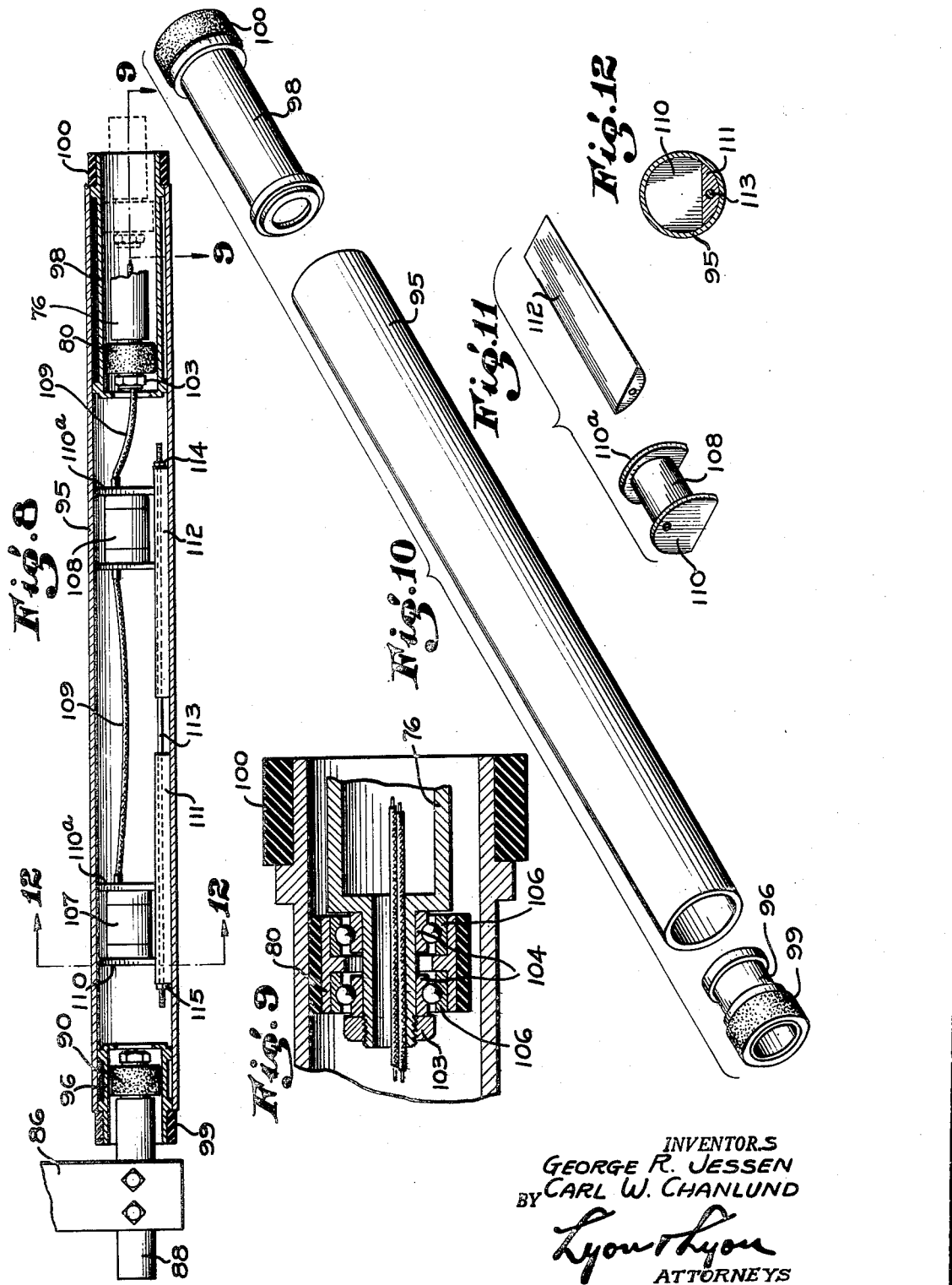

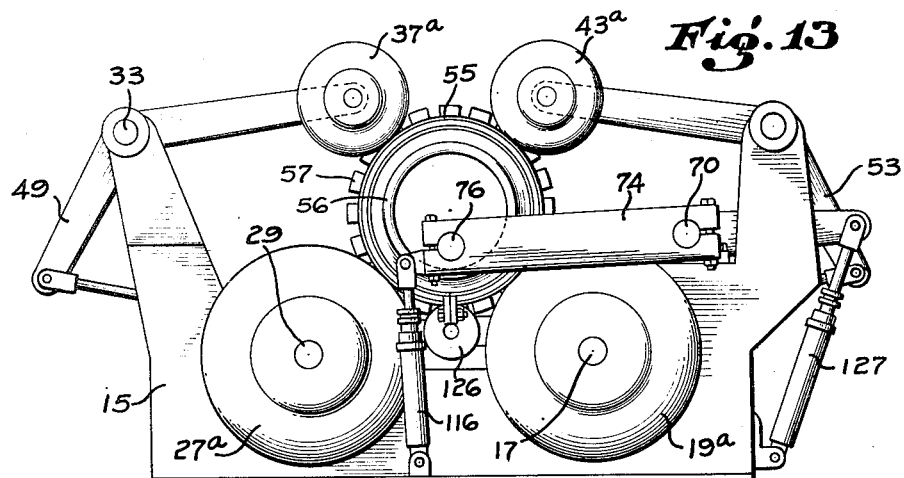
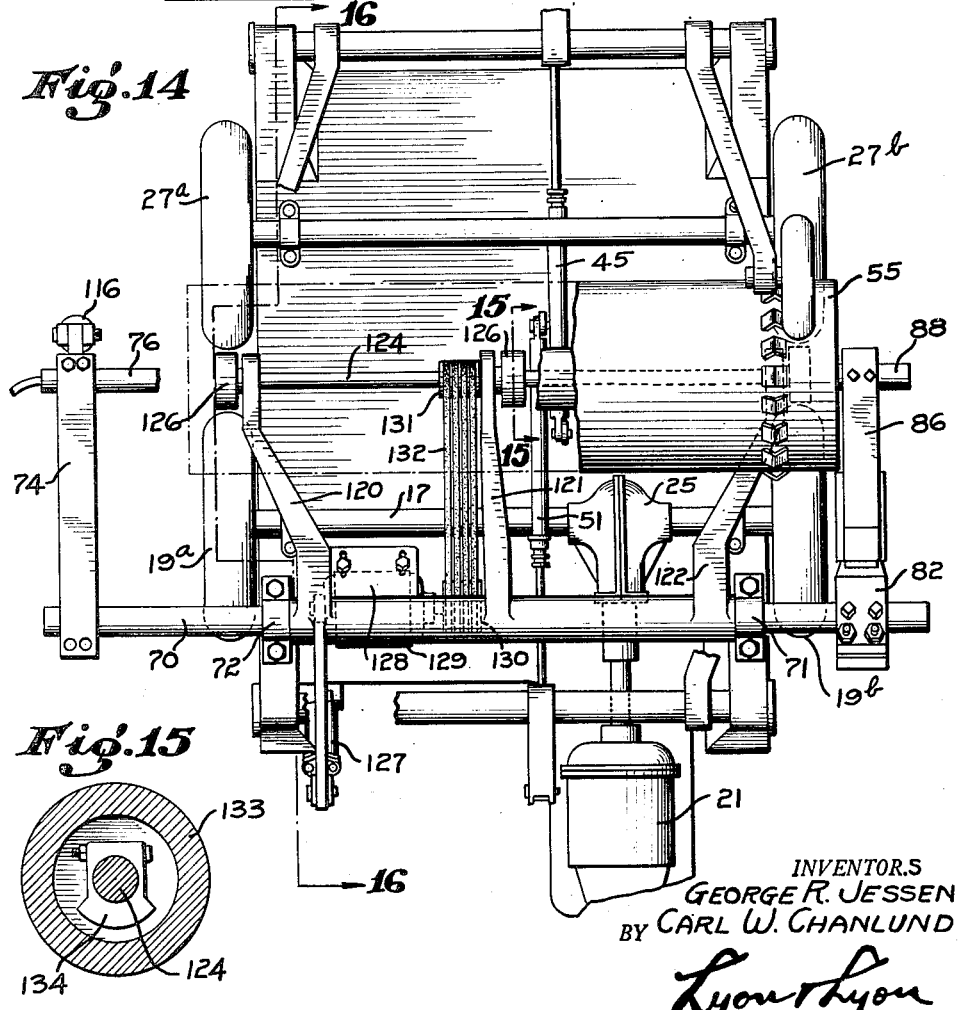

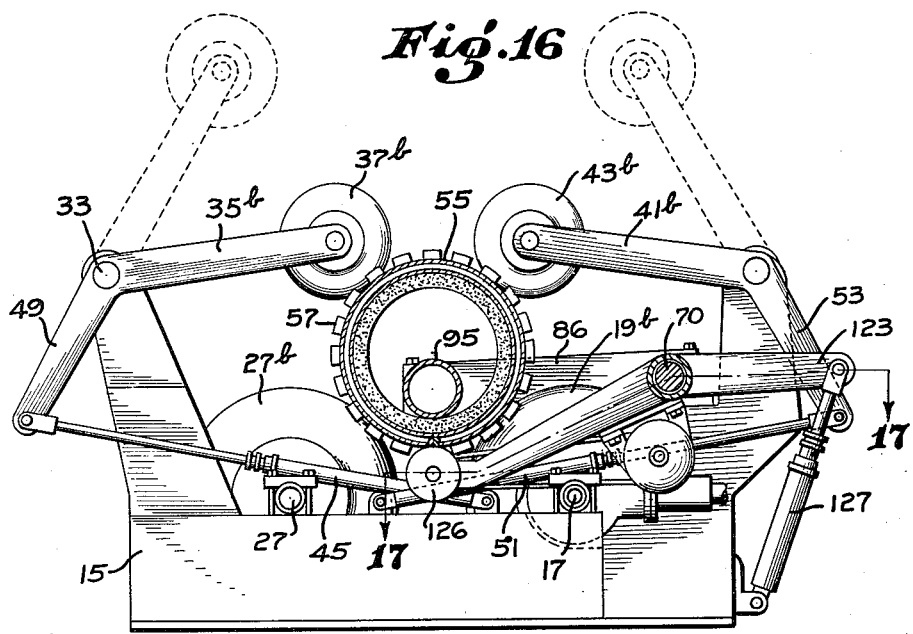
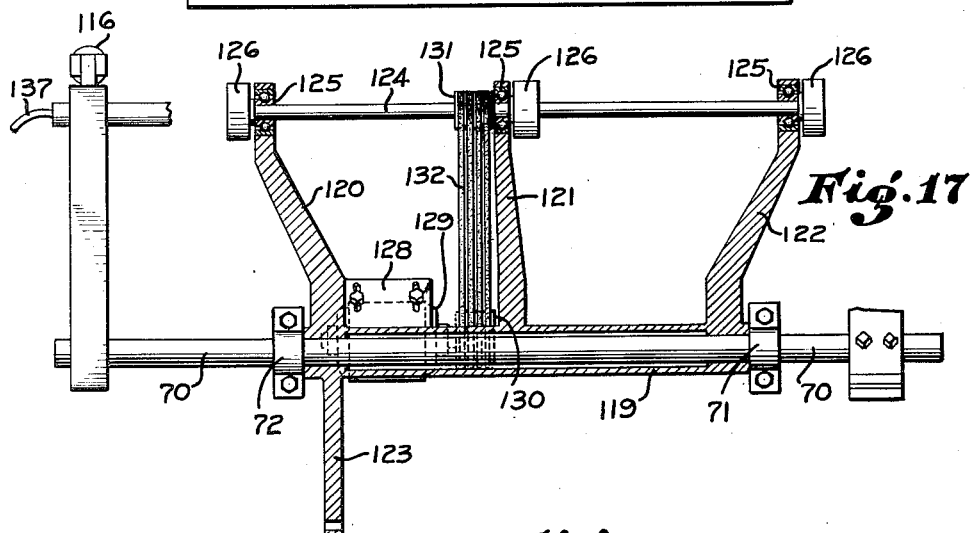
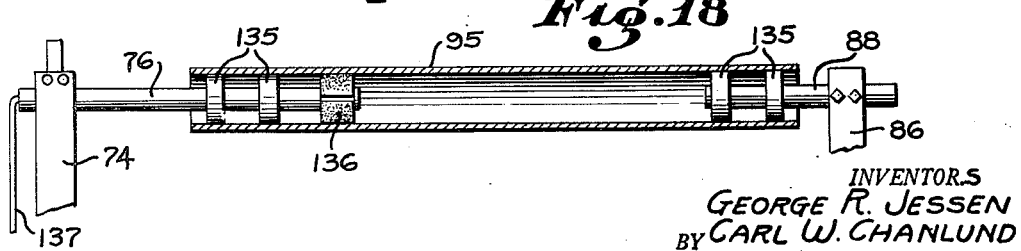

Patented Mar. 9, 1954

2,671,260

UNITED STATES PATENT OFFICE 2,671,260

METHOD AND APPARATUS FOR MAKING PIPE FROM CONCRETE AND LIKE MATERIALS

George R. Jessen and Carl W. Chanlund, Salt Lake City, Utah, assignors, by mesne assignments, to George R. Jessen Application September 29, 1950, Serial No. 187,452

18 Claims. (Cl. 25—30)

This invention relates to methods and apparatus for manufacturing concrete pipes or the like, or the lining of metal or other pipes with concrete or like material.

Several types of machines have heretofore been employed for manufacturing concrete pipes or other hollow bodies, or for lining metal or other pipes with concrete wherein a spinning mold is employed. In general, such machines utilize centrifugal force for packing wet concrete about the interior of a hollow cylindrical mold, the mold being spun at relatively high speeds by means of roller trunnions upon which the mold rests. The desired material, usually concrete, is introduced into the interior of the mold. The centrifugal force caused by the rapid spinning of the mold causes the material to be distributed and packed against the inner wall of the mold to form the desired finished product. Such machines have proved commercially practical and are extensively used. They have been found, however, to possess several inherent disadvantages. Among these are:

In order to obtain a uniform distribution of the concrete about the inner wall of the mold, it is necessary that the concrete be in a relatively fluid state. This requires the employment of wet concrete, that is, concrete having a high water-cement ratio. The result is that the finished product does not possess the strength or durability which would be achieved were a drier concrete used. Besides weakening the final product, the highly fluid state of the wet concrete also results in extensive leakage of the concrete through the mold joints with its consequent waste and other undesirable results. In addition, it has been found that for proper operation, the mold in existing machines must be spun at a very high rate of speed. Thus, speeds on the order of 3,000 to 5,000 feet per minute are commonly employed. The resulting strong centrifugal action causes, in the wet concrete used, the larger particles of the material such as the gravel, to be dispersed at the outer surface of the product, whereas the finer particles are concentrated at the inner surface. This segregation of the constituent materials further reduces the strength and durable properties of the concrete. Also, pipes manufactured on existing machines have been found to possess blisters and other irregularities. A further disadvantage of existing high speed centrifugal type machines lies in the fact that due to the weights of the mold and material therein, and the high speed at which they must be rotated, it is customary to employ trunnion rollers which are constructed of steel in order that excessive wear does not occur. Even by the use of steel trunnions, however, wear is a costly factor, both as regards the mold and the trunnion rollers. Due also to the high speeds required, in order to withstand the appreciable forces set up, and also excessive vibrations resulting from the use of steel trunnions, it is necessary to use ponderous and costly equipment. Further, the use of steel trunnions results in an exceedingly large amount of noise. While this latter might not appear to be of any great significance, it has been found that the noise caused by existing types of machines will, after prolonged periods of time, seriously impair the health of workers in the vicinity of the machine. Further, this noise necessitates the use of pipe forming machines only in remote areas which frequently proves inconvenient and undesirable.

Several solutions to the above problems have heretofore been proposed. For example, it has been suggested that the centrifugal method of making concrete pipe be abandoned and that the pipe be constructed by using a vertically disposed double form, the concrete being tamped between the form layers. Another proposal is set forth in the patent to S. H. Edmonds, No. 1,750,743, wherein it is suggested that instead of centrifugal force, the concrete be packed by means of a simple packing roller which distributes and compresses the concrete against the inner wall of a horizontally disposed mold, the mold being rotated at a very slow rate as the concrete is introduced into its interior. It has been found, however, that neither of these suggested methods is satisfactory for many applications, with the result that, despite its shortcomings, the centrifugal method is still very widely employed.

In accordance with the present invention, an improved method and machine is provided which, while utilizing the centrifugal technique, will substantially eliminate each of the above described disadvantages.

A method and machine is provided which employs one or more unique vibrating members which impart a controlled high frequency vibration to the concrete as the mold is spun. Simultaneously, a freely rotating packing roller is employed which bears against the concrete as the mold is spun. Such a machine makes possible the use of relatively dry concrete. Further, it produces pipes of uniform, non-segregated material which does not possess weakening blisters or other irregularities. Due to the presence of the vibrations set up in the concrete, considerably reduced driving speeds and hence reduced centrifugal forces can be employed. Further, pneumatic rubber driving trunnion rollers and stabilizers are utilized which serve to absorb undesired vibrations and substantially eliminate the excessive noise of existing centrifugal types of machines. In addition, such machine has been found capable of producing concrete pipe in considerably less time than is required in existing centrifugal type machines, with resulting savings in manufacturing costs. Accordingly, It is an object of this invention to provide such a machine for forming hollow concrete bodies or the like from relatively dry concrete.

It is a further object of this invention to provide such machine of the centrifugal type which can be operated satisfactorily at relatively low speeds of rotation.

It is another object of this invention to provide such a machine wherein undesired vibrations are avoided.

It is still another object of this invention to provide such a machine which will operate without causing excessive noise.

It is still a further object of this invention to provide such a machine which can be economically constructed, operated and maintained.

It is another object of the invention to provide such a machine which is capable of producing, in less time, concrete pipe of high qaulity and strength.

It is an additional object of this invention to provide a method for forming concrete pipe or pipe lining by the centrifugal method wherein reduced form spinning speeds and drier concrete can be employed.

It is a more specific object of the invention to provide a method and machine for forming concrete pipe wherein the pipe is formed by simultaneously spinning, packing and vibrating the concrete.

Other objects and advantages of the invention will be apparent during the course of the following description.

In the accompanying drawings forming a part of this application, and in which like numerals are employed to designate like parts throughout the same, Fig. 1 is a perspective view of a concrete pipe machine embodying the invention.

Fig. 3 is a perspective view showing a portion of the machine.

Fig. 4 is an elevation partly in section taken along the line 4—4 of Fig. 2.

Fig. 5 is a vertical section taken along line 5—5 of Fig. 4.

Fig. 6 is a plan view of the machine.

Fig. 7 is a fragmentary perspective view showing a further portion of the machine.

Fig. 8 is a central horizontal section taken along line 8—8 of Fig. 4, showing the vibrating roller portion of the machine.

Fig. 9 is a horizontal section taken along line 9—9 of Fig. 8.

Fig. 10 is an isometric view further illustrating the vibrating roller portion of the machine.

Fig. 11 is a perspective view illustrating the vibrator mounting and wedge lock employed in the vibrating roller.

Fig. 12 is a vertical section taken along line 12—12 of Fig. 8.

Fig. 13 is an end view of a modified concrete pipe machine embodying the invention.

Fig. 14 is a plan view of the machine shown in Fig. 13 with portions thereof broken away for clarity.

Fig. 15 is a vertical section taken along line 15—15 of Fig. 14.

Fig. 16 is a vertical section taken along line 16—16 of Fig. 14.

Fig. 17 is a section taken along the line 17—17 of Fig. 16.

Fig. 18 is a fragmentary cross section illustrating the roller packer element of the machine shown in Fig. 13.

Figure 1:
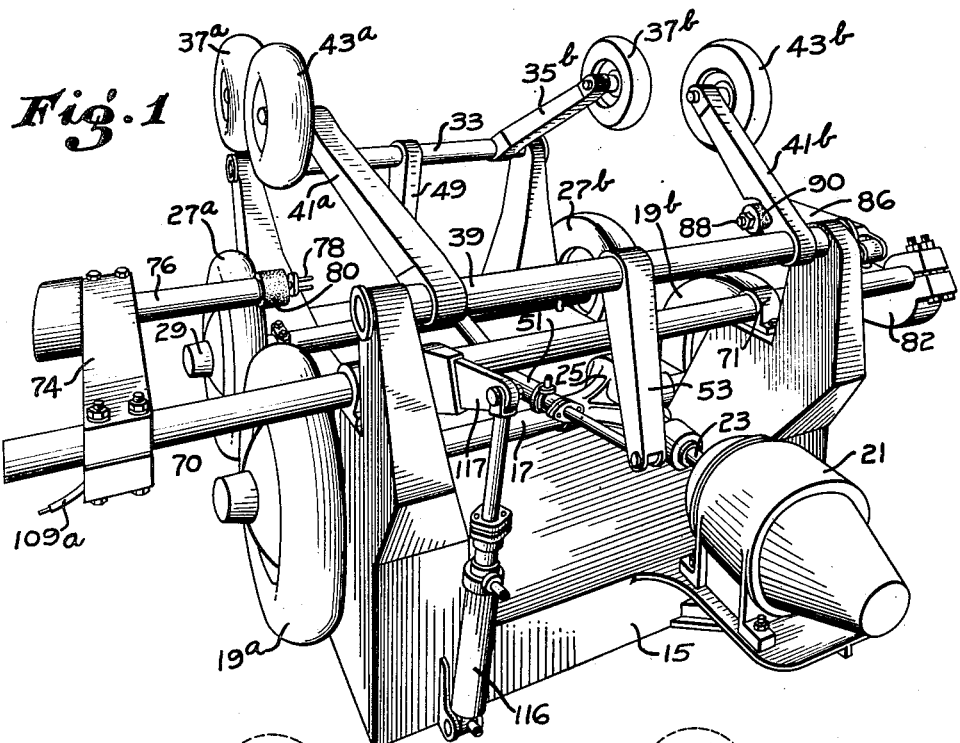
Figure 2:
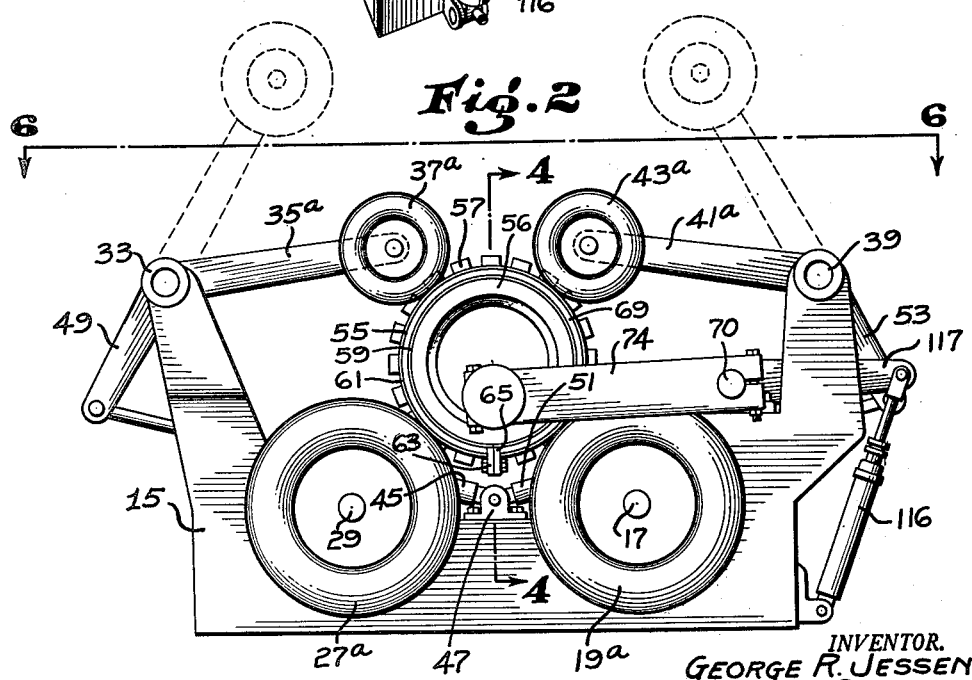
Fig. 2 is an end view of the machine.

In the drawings, wherein for the purpose of illustration are shown preferred embodiments of the invention, the numeral 15 designates generally the supporting frame for the machine. In the base portion of the frame are located a pair of oil reservoirs, not shown, for use in conjunction with the hydraulic drive mechanisms of the machine to be described hereinafter. Carried by an axle 17 is a pair of trunnion rollers 19a and 19b. Trunnion rollers 19a and 19b are driven by a power source indicated generally as 21, associated with which is a drive shaft 23 and a suitable differential or gear box 25. Trunnion rollers 19a and 19b are of pneumatic tire construction, being preferably well inflated. A pair of freely rotating idler trunnion rollers 27a and 27b carried by a suitable axle 29 is provided as indicated. The axles 17 and 29 are secured to the frame 15 in any suitable manner as by brackets 31. Idler trunnion rollers 27a and 27b are also of pneumatic tire construction, being identical to the driving roller trunnions 19a and 19b. As shown, journaled in the frame 15 is a rock shaft 33, carrying stabilizer arms 35a and 35b. The stabilizer arms 35a and 35b carry stabilizer trunnion rollers 37a and 37b. In like manner, a rock shaft 39 is journaled in the frame 15 and carries stabilizer arms 41a and 41b by which are carried additional stabilizer trunnion rollers 43a and 43b. The stabilizer trunnion rollers 37a and 37b, 43a and 43b are preferably somewhat smaller in size than are the trunnion rollers 19a, 19b, 27a and 27b, but are also of pneumatic rubber tire construction. Each of these stabilizer trunnion rollers is mounted upon its respective stabilizer arm by suitable bearings as to be freely rotatable. A hydraulic ram 45 is mounted on the frame 15 as by a bracket 47. The ram 45 is connected to operate the rock shaft 33 through a crank 49, which crank is fixedly secured to the rock shaft 33. By operating the ram 45, the stabilizer arms 35a, 35b, and therefore the position of the stabilizer roller trunnions 37a, 37b may be varied, as best seen in Fig. 2. Similarly, the position of stabilizer roller trunnions 43a, 43b is controlled by a hydraulic ram 51 and a crank 53. While in the drawings the rams 45 and 51 have been shown as being of the hydraulic type, it is to be understood that other fluid type rams, for example, air rams, may be employed with satisfactory results.

While in each of the drawings additional features are incorporated which will hereinafter be explained, the machine thus far described is fully operative and incorporates certain important features of the invention. Thus, to operate the machine, a suitable hollow cylindrical mold 55 is placed upon the roller trunnions 19a, 19b, 27a, 27b. In the drawings, there has been shown a mold of the double shell, single joint type in which circumferential trunnion guides 57 are employed to prevent lateral displacement of the mold during operation of the machine. The mold is constructed of a pair of spaced shells 59 and 61 which are welded to longitudinal flanges 63 and 65. A series of bolts 67 are provided to hold the mold in its closed or operating position. A series of spacing ribs 69 are provided to maintain the spaced relationship between the shells 59 and 61, and to give the mold the necessary strength and rigidity. While the mold shown forms no part of the present invention, it has been described inasmuch as it has been found to be particularly suitable for machines constructed in accordance with the present invention. This is particularly due to the fact that the mold is of lighter weight than other types of molds currently used, with the result that pneumatic trunnions of the type described can be used, even for high speed operation without serious wear. It is to be understood, however, that the machine may be successfully used with other types of molds. The particular mold shown is the subject matter of a copending application, Serial No. 187,443, filed September 29, 1950. In addition, while reference is made only to a mold or to a molding element, the present invention is directed also to a machine and method for lining steel or other pipe with concrete or like material. It is therefore to be understood that where the terms "mold" or "molding element" are used in either the description or claims of this specification, such terms are intended to include within their meaning a steel or other pipe which is to be lined.

To place the mold 55 in its operative position on the lower trunnion rollers, the hydraulic rams 45 and 51 are employed to raise the stabilizer trunnion rollers 37a, 37b, 43a and 43b to the extended position shown in dotted lines in Fig. 2, so as to provide clearance for the insertion of the mold. Next, the stabilizer trunnions are lowered to bear against the mold 55 at the desired pressure. The driving roller trunnions 19a and 19b are then driven by the power source 21, and concrete or other suitable material is distributed throughout the inner circumference of the mold 55. The technique employed in introducing concrete into a spinning mold such as 55 is well known in the art, and need not, therefore, be described herein. The spinning of the mold and the consequent centrifugal forces set up will cause the concrete to be deposited and packed about the inner periphery of the mold in the familiar manner. After the mold has been spun a sufficient length of time, the stabilizer trunnion rollers are raised to the position shown in dotted lines in Fig. 2, the mold is expanded and the finished product is removed therefrom.

The use of pneumatic trunnion rollers results in several distinct advantages. Principal among these is the elimination of excessive noise caused by the steel type trunnions heretofore employed. In addition, the resilient characteristic of the pneumatic trunnion rollers results in the absorption of undesired vibrations normally set up by the spinning mold. When the mold is spun at a relatively high rate of speed, such vibrations cause excessive wear and tear upon the machine and make necessary the construction of the machine from exceedingly heavy and cumbersome and therefore costly parts. Further advantages in the employment of the pneumatic stabilizer trunnion rollers in connection with their respective hydraulic rams is that the spinning mold may be held in place to bear on the lower trunnion rollers at the desired pressure. Were the stabilizer trunnion rollers not employed, smooth operation would be impossible at high speeds due to vibration of the mold. With such stabilizers, however, the mold can be rotated smoothly even though high speeds are employed. A further advantage is found in the employment of pneumatic trunnion rollers in that it frequently occurs that the molds used are not truly cylindrical. Thus, the molds frequently taper toward one end. Such a mold, however, can be satisfactorily employed in the present machine by simply varying the air pressure in the proper trunnion rollers. Thus, if it be found that the mold is of slightly lesser diameter at one end thereof, by simply inflating the trunnion rollers at that end to greater air pressure, or conversely, slightly deflating the rollers at the other end, the mold can be made to spin smoothly. The provision of the hydraulic rams associated with the upper stabilizer trunnion rollers makes possible not only the increase of the pressure at which the mold bears upon the lower trunnions, thereby eliminating in large measure troublesome slippage between the mold and the driving trunnion rollers, but also provides an exceedingly convenient means for withdrawing the upper stabilizer trunnion rollers when it is desired to insert or withdraw the mold.

While the machine, as thus far described, is fully operative and possesses several distinct advantages over known centrifugal type pipe forming machines, its use requires that the mold be spun at a relatively high speed. Further, a concrete having an undesirably high water-cement ratio must be used.

As above pointed out, these requirements result in several disadvantages, among which are segregation of the concrete constituents, formation of blisters and other non-uniformities, form joint leakage and the like. In accordance with the present invention, and as a further feature thereof, a unique attachment is provided which largely eliminates these difficulties, making possible the employment of relatively dry concrete and low running speeds. Referring again to the figures, there is shown a rock shaft 70 extending longitudinally of the machine, journaled in brackets 71 and 72 which are secured to the frame 15. Fixedly carried by the shaft 70 is an arm 74 which in turn carries a shaft 76. Electrical conductors 109a are extended, from a suitable power source, through the arm 74 and shaft 76 to the rotatable connectors 78. Journaled about the shaft 76 in a manner to be hereinafter described, is a wheel 80 which is preferably constructed of hard rubber. Fixedly carried by the rock shaft 70 at the other end thereof, is a stub arm 82. Pivotally held by the stub arm 82 by means of a pivot pin 84, is an arm 86 in which is fixedly held shaft 88 having a wheel 90 similar to the wheel 80 journaled about the inward end thereof. A hydraulic ram 92 is attached by means of a clevis 93 to the slotted bracket 94 which in turn is integrally connected to the shaft 88. The arm 86 is pivotally connected to the pin 84 as at 87 in such manner that the hydraulic ram 92 can be used to raise or lower the arm 86 and hence the shaft 88. As will hereinafter be described, the shafts 76 and 88 are employed to hold a roller packer element 95 which extends longitudinally into the interior of the mold 55. In order that the mold 55 may be placed or removed, the arm 86, and hence the shaft 88, the position of which may be controlled by the hydraulic ram 92, is pivotally mounted upon the stub arm 82, thereby permitting ready removal of the mold 55 without, as will hereinafter become apparent, removing the roller packer 95.

Referring particularly to Figs. 8, 9 and 10, there is shown a tubular roller packer 95. End pieces 96 and 98 are provided for the roller packer 95 which are adapted to be inserted to fit snugly therein. End piece 96 is provided with a rubber collar 99 and end piece 98 is provided with a similar rubber collar 100. When the end pieces are properly positioned, the ends of the roller 95 abut snugly against each of the rubber collars 99 and 100, as shown in Fig. 8. The roller 95 is inserted into the mold 55 throughout its entire length. Shaft 88 is inserted into the end piece 96, and the roller is carried by a rubber wheel 90. In like manner, shaft 76 is inserted into end piece 98 and the roller is carried by a rubber wheel 80. For reasons which will hereinafter be explained, during operation of the machine, the roller 95 is caused to bear and thus apply pressure against the inner wall of the cement pipe being formed and to rotate freely as the mold 55 is spun. In order that the roller 95 may freely rotate, wheels 80 and 90 which carry the roller are constructed so as to be freely rotatable on their respective shafts 76 and 88. As seen in Fig. 9, this is accomplished by means of suitable ball bearings. Thus, the end portion of shaft 76 is in the form of a bolt, the wheel 80 being held in place by nut 102. Circumferential bearing races 104 and 106 are provided. It is thus seen that the wheel 80 is journaled about the shaft 76, permitting end piece 98 and consequently roller 95 to rotate freely. Wheel 90 is journaled about shaft 88 in an identical manner. In addition, in the modification of the invention now being described, one or more vibrating elements are disposed within the roller packer 95. In order to isolate the vibrations caused thereby, wheels 80 and 90 are preferably constructed of solid gum rubber. As seen, shaft 76 extends the full depth of end piece 98 and is somewhat longer than shaft 88. For this reason, the roller 95 can be maintained in position while the mold 55 is being placed upon or removed from the machine. Thus, arm 86 and consequently shaft 88 and attached wheel 90 are swung outwardly, pivoting on pivot pin 84, thereby permitting placement or withdrawal of mold 55. At this time, roller 95 will be supported in position shaft 76 and attached wheel 80. A suitable latch, not shown, is provided to lock arm 86 in operating position.

Disposed inside the roller 95 along its length, is a pair of electrical vibrator units 107 and 108 to which electrical power is supplied by the cable 109, which cable is connected to the connector 78. These electrical vibrator units are of conventional design and are not, therefore, described herein in detail. Their function is to impart a small high frequency vibration to the roller 95 for a purpose which will hereinafter be described. While the vibrating frequency of these vibrators can be varied over a considerable range, it has been found that a frequency of not less than about 8,000 per minute is to be preferred. While electrical vibrators are shown, it is to be understood that other types such as air or mechanical vibrators can be employed with equally satisfactory results. In order to maintain the vibrators in the desired position in the rollers, each of the vibrators is mounted upon truncated circular plates 110 and 110a. Under each pair of truncated plates is placed wedge 111 or 112. A bolt 113 extends through the wedges to which nuts 114 and 115 are secured. The vibrators 107 and 108 are held firmly in place by tightening the bolts 114 and 115, the circular portion of the plates 110 and 110a being wedged against the upper portion of the roller 95, thereby securely holding the vibrators in place.

While there have been shown two vibrators in the embodiment of the invention illustrated in the drawings, it is to be understood that this number is not critical and will in general be determined by the size of pipe being constructed. Thus, for short lengths of pipe of small diameter, but a single vibrator will be satisfactory, whereas for larger sizes of pipe, three or more vibrators may be found desirable.

The position of the roller 95 within the mold 55 is controlled by means of a hydraulic ram 116 which is attached at one end to the frame 15 and at the other to the crank 117. As seen, the crank 117 is connected to the rock shaft 70. By turning the rock shaft 70, the arms 74 and 86, and consequently the roller 95, can be raised or lowered as desired. In this manner, the position of the roller and the pressure with which it bears against the concrete in the mold may be readily controlled.

To operate the machine, when the roller packer and vibrators above described are used, the mold 55 is placed upon the trunnion rollers 19a, 19b, 27a, 27b, and the stabilizer trunnion rollers 37a, 37b, 43a, 43b are lowered into position. Normally, the roller packer will be resting upon the end piece 98 which in turn is supported by the wheel 80, and the arm 86 will be pivoted outwardly to permit placement of the mold. In order to place the roller packer 95 into position, the arm 86 is pivoted about pivot pin 84 to insert the shaft 88 into the roller 95. The hydraulic ram 92 is provided to raise or lower the shaft 88 to facilitate its entrance and withdrawal from the roller. Thus, as will be hereinafter described, and as seen in Fig. 8, the wheel 90 which carries the roller 95 is slightly smaller in diameter than the inner diameter of the end piece 96 of the roller. In order to withdraw the finished pipe, the roller 95 must be raised free of the pipe. When the roller is thus raised, it will ride upon the top portion of the wheel 90. To free the roller from the wheel, thereby facilitating removal and subsequent entrance of the shaft 88, the hydraulic ram 92 is employed to lower the shaft 88.

After the mold 55 is placed, the roller packer 95 is lowered to rest upon the end former rings 56 of the mold 55. The mold is then spun, concrete being placed inside the mold in a manner well known in the art. The hydraulic ram 116 is operated to lower the roller 95 in the mold 55. Current is applied through the cable 109 to the vibrators 107 and 108 and the mold is spun for the period of time necessary to form the pipe.

The use of the roller packer and the vibrators has been found to have a very pronounced effect. It has been found that a very much drier concrete can be employed. For example, concretes having a cement-water ratio on the order of about 0.25 have been found to be entirely satisfactory. The advantages realized from this effect, drier concrete, have previously been described and need not here be repeated. The action of the vibrator together with the roller packer is thought to alter the physical characteristics of the concrete, more particularly its consistency in such way as to greatly increase its fluidity. This change in consistency is believed to be due to the fact that the rapid vibrations set up in the concrete neutralize the static friction between the particles of the various materials contained in the concrete. This neutralization of static friction appreciably reduces the force required to properly pack the concrete. Consequently, less centrifugal force, hence lower spinning speeds and the use of drier concrete are made possible.

In addition to the above, it has been found that undesirable segregation and other deleterious non-uniformities, resulting from the employment of high water content concrete are avoided. As a further advantage, experience has shown that concrete pipe can be uniformly distributed and packed in considerably less time than is required in existing machines. Thus, it has been found that less than one-third the time is required to completely fabricate a concrete pipe in a machine embodying what might be termed the roller-packer-vibrator feature of the present invention than that required to fabricate the same sized pipe in a conventional type spinning machine and according to conventional methods.

Two means are employed in the machine described above to prevent the vibration deliberately set up in the roller 95 from reaching the frame 15, and consequently all parts of the machine. First, the wheels 80 and 90 which carry the roller 95 are of resilient material and are constructed so that their diameter is slightly less, for example ¼", than the inner diameter of the end pieces 96 and 98. The result is that, as shown in Fig. 8, the roller 95 will contact the wheels 80 and 90 over but a small portion of the circumference thereof and will be free to vibrate thereon. Were the wheels 80 and 90 to engage the end pieces 96 and 98 about their entire circumference, not only would the vibrations of the roller be undesirably damped to a considerable degree by the shafts 76 and 88, but also these vibrations would be transmitted thereby to the frame 15. A certain amount of vibration from the roller 95 is transmitted through the concrete to the mold. Were steel trunnions employed, these vibrations would, of course, be transmitted to the rest of the machine. By utilizing the pneumatic trunnion rollers and the pneumatic stabilizer trunnion rollers, such vibrations are largely absorbed and have been found to cause no difficulty.

In Figs. 13 to 18, there is illustrated a modified form of pipe spinning machine embodying the present invention. In general, this machine incorporates the great majority of features of that previously described, and consequently, with respect to such features, like numerals are used in the drawings, and the description heretofore given is applicable.

The principal difference in the machine shown in Figs. 13 to 18 is that the vibrators are disposed below and bear against the exterior of the mold 55 in a zone directly opposite and below the roller 95 rather than being disposed within the roller 95. Thus, disposed between brackets 71 and 72 and journaled upon rock shaft 70 is a sleeve 119 from which extends arms 120, 121, 122 and a crank 123. Journaled in the end portions of the arms 120, 121, 122 in suitable rubber mounted bearings 125 is a shaft 124. Rubber mounted bearings 125 serve to isolate the vibrations set up in shaft 124 by the vibrators to be hereinafter described. Attached at one end thereof to the crank 123 is a hydraulic ram 127. The other end of the ram 127 is attached to the frame 15 as shown. Mounted upon a plate 128 which extends from and is integral with the arm 120 and the sleeve 119 is a motor 129. The motor 129, by means of sheaves 130 and 131 and belts 132 is employed to rotate the shaft 124, which rotation imparts a rapid vibration to the vibrators 126 in a manner which will now be described.

Referring to Fig. 15 wherein is shown a cross-section of one of the vibrators 126, the vibrator is seen to consist of an outer shell or roller 133 and an inner eccentric weight 134. The outer shell or roller 133 is mounted upon suitable bearings so as to be freely rotatable upon the shaft 124. As the shaft 124 is rotated by the motor 129, the eccentric weight 134 will impart a vibration to the shaft 124 and consequently to the outer shell 133, the latter being adapted to be rotated as a result of contact with the exterior of the mold 55.

By operating the hydraulic ram 127, the shaft 124 and consequently the vibrators 126 can be raised and lowered, and the pressure with which such vibrators bear against the mold 55 controlled.

While the type and means of mounting the vibrators above described have been found to be preferred, both from the standpoint of simplicity and durability, it is to be understood that other types and means may be employed without departing from the invention. Thus, air or electrical vibrators may be used. Further, the vibrators can be attached directly to the mold with suitable rotating connections thereto.

As seen, in the modification of the invention now being described, no vibrators are placed in the roller 95. The absence of such vibrators makes preferable a greatly simplified construction of the means for holding roller 95 in position. Referring to Fig. 18, it is seen that the end pieces 96 and 98 heretofore described are not used and that simple roller support bearings 135 carried by shafts 76 and 88 are employed. The roller 95 freely rotates upon these bearings.

Another change in the embodiment of the invention illustrated in Figs. 13 to 18 over that heretofore described is that the location of the hydraulic ram 116 is changed. Thus, in the machine now being described, the hydraulic ram 116 is connected directly to the arm 74 in close proximity to the shaft 76. This re-location of the hydraulic ram 116 makes possible a greater roller pressure on the concrete during the operation of the machine than that which can be achieved when the ram is employed in connection with a crank as heretofore described.

A further feature shown in the embodiment of the invention now being described is the presence of a braking mechanism within the roller 95 which, when activated, will prevent further rotation of said roller. Thus, carried at the end of shaft 76 is a hydraulic brake shoe 136 which is constructed of suitable resilient material. This brake shoe is controlled through a brake line 137 in such manner that it can be expanded so as to brake the roller 95, thereby preventing its rotation. The purpose of the brake shoe 136 is to enable the roller to be used as a trowel for smoothing the interior of the pipe, as will hereinafter be explained. While brake shoe 136 has been shown only in the machine of Figs. 13 to 18, it is to be understood that it can readily be incorporated in the machine previously described. For such construction, however, it is preferable to employ a somewhat longer shaft 76 so that the brake shoe, when activated, will bear directly against the roller 95 rather than the end piece 98.

The embodiment of the invention disclosed in Figs. 13 to 18 possesses several advantages over that heretofore described. Thus, it has been found that by locating the vibrators so as to bear against and impart a vibration directly to the mold, somewhat better results are achieved. For example, it has been found that a stronger and more uniform pipe results and that the time necessary for its construction is reduced. In addition, a somewhat more coarse aggregate can be employed and an even lower water-cement ratio can be used. It should be noted, however, that by so locating the vibrators, an additional control element, the hydraulic ram 127, is required.

The inclusion of the brake shoe 136 makes possible the forming of a relatively smooth pipe interior which, for some applications, is highly desirable. Thus, after the machine has been operated a sufficient period of time to pack the concrete against the mold 55, the vibrator elements are turned off and the hydraulic ram 116 is employed to raise the roller 95 so that it just touches the concrete. Next, fluid is applied through the brake line 137 to expand the brake shoe 136, thereby preventing further rotation of the roller 95. Further spinning of the mold 55 will cause the roller 95 to trowel the interior of the pipe, thereby imparting a relatively smooth surface thereto.

In all other respects the operation of the modification of the invention shown in Figs. 13 to 18 is identical to that previously described and further description thereof is therefore unnecessary.

As a further modification of the invention, it has been found that for many applications it is desirable to incorporate the several features of the two machines heretofore described in a single machine. Thus, it has been found that if a roller of the type shown in Fig. 8 in which are located vibrators such as 107 and 108 is used to vibrate the concrete from within, and also vibrators 126 such as shown in Fig. 17 are employed to simultaneously vibrate the mold itself, certain additional advantages are realized. While such construction adds somewhat to the complexity of the equipment, it has been found that for certain applications this added complexity is well warranted. Thus, where the concrete is vibrated directly by the roller and indirectly through the mold, it has been found that a stronger and more uniform pipe results. Further, an even greater reduction in water-cement ratio and the use of an even more coarse aggregate is made possible. In addition to these advantages, the time required to produce a pipe is further decreased with consequent reduction in expense.

It is to be understood that the forms of the invention herein shown and described are to be taken as preferred examples of the same and that various changes in the shape, size and arrangement of parts may be resorted to without departing from the scope of the invention or the scope of the appended claims.

We claim:

1. In a concrete pipe spinning machine, the combination comprising: a driven hollow cylindrical molding element adapted to receive concrete; a roller element extending longitudinally into the interior of said molding element and adapted to bear against said concrete, means adapted to raise and lower the said roller element within said molding element, and a braking element disposed within the said roller element and adapted, when activated, to prevent rotation of the said roller element.

2. In a concrete pipe spinning machine, the combination comprising: a driven hollow cylindrical mold adapted to receive concrete; a roller element extending longitudinally into the interior of the said mold and adapted to bear against said concrete, and a braking element disposed within the said roller element and adapted, when activated, to prevent rotation of the said roller element.

3. In a machine for making a hollow cylindrical concrete structure; a cylindrical mold; means for rotatably and drivingly supporting said mold; and means operating independently of said mold driving means and located at a fixed position relative to the axis of rotation of the mold for imparting high frequency vibrations to said mold, said last-mentioned means comprising a high frequency vibrator mounted to be moved into contact with the exterior of said mold while said mold is rotating to impart vibrations thereto; and means for moving said vibrator into contact with said mold.

4. A machine as defined in claim 3, in which the means for moving the vibrator into contact with the mold is adjustable for controlling the contact pressure of the vibrator with the mold to vary the amplitude of the vibrations.

5. In a machine for making a hollow cylindrical concrete structure; a cylindrical mold; means for rotatably and drivingly supporting said mold; and means operating independently of said mold driving means and located at a fixed position relative to the axis of rotation of the mold for imparting vibrations to said mold, said last-mentioned means comprising at least one vibrator for contacting the exterior of said mold to impart high frequency vibrations thereto while said mold is rotating, an arm supporting said vibrator, means mounting said arm for pivotal movement with respect to said mold, and means for rocking said arm about its pivot to adjust the position of said vibrator relative to said mold.

6. In a machine for making a hollow cylindrical concrete structure; a cylindrical mold; means for rotatably and drivingly supporting said mold; means operating independently of said mold driving means and located at a fixed point relative to the axis of rotation of said mold for imparting high frequency vibrations to said mold, said last-mentioned means comprising a freely rotatable, vibrating roller mounted to be moved into contact with the exterior of said mold while said mold is rotating to impart vibrations thereto; and means for so moving said vibrating roller.

7. A machine as defined in claim 6 in which the cylindrical mold is horizontal and the vibrating roller is mounted to engage the exterior of the mold at the lower portion thereof.

8. A machine as defined in claim 7, including a pressure roller extending into the mold; and means for moving said pressure roller downwardly to apply positive pressure to the concrete mix in said mold in a zone above the vibrating roller.

9. In a machine for forming a hollow cylindrical concrete structure, the combination comprising: a rotatable hollow cylindrical mold element adapted to receive a substantially dry concrete mix; means for supporting and imparting spinning movement to said mold element at a speed sufficiently high to distribute and pack the concrete mix against the mold element by centrifugal force; a roller element extending longitudinally into the interior of said mold element; means including fluid pressure operated cylinder means for moving said roller element into engagement with the concrete mix and for applying positive pressure to the mix through said roller element to further pack the mix against said mold element while said mold element is spinning; and a high frequency vibrator mounted in said roller element and effective upon said roller element to vibrate the same to still further pack the mix against said mold element.

10. In a machine for forming a hollow cylindrical concrete structure, the combination comprising: a rotatable hollow cylindrical mold element adapted to receive a substantially dry concrete mix; means for supporting and imparting spinning movement to said mold element at a speed sufficiently high to distribute and pack the concrete mix against the mold element by centrifugal force including a frame and pneumatic rubber trunnion rollers mounted upon said frame and rotatably supporting the mold element; a roller element extending longitudinally into the interior of said mold element; means including fluid pressure operated cylinder means for moving said roller element into engagement with the concrete mix and for applying positive pressure to the mix through said roller element to further pack the mix against said mold element while said mold element is spinning; two longitudinal rock shafts journalled in said frame and disposed on opposite sides of said mold element, at least one arm secured to each of said rock shafts and extending inwardly therefrom; a pneumatic rubber stabilizer roller rotatably mounted on each of said arms; means connected with each rock shaft for raising and lowering each of said stabilizer rollers relative to the mold element; a high frequency vibrator including a freely rotatable roller; and means for moving said last-mentioned roller into contact with the exterior of the mold element to vibrate the mold element to still further pack the mix against said mold element.

11. In a machine for forming a hollow cylindrical concrete structure, the combination comprising: a rotatable hollow cylindrical mold element adapted to receive a substantially dry concrete mix; means for supporting and imparting spinning movement to said mold element at a speed sufficiently high to distribute and pack the concrete mix against the mold element by centrifugal force; a roller element extending longitudinally into the interior of said mold element; means including fluid pressure operated cylinder means for moving said roller element into engagement with the concrete mix and for applying positive pressure to the mix through said roller element to further pack the mix against said mold element while said mold element is spinning; and a high frequency vibrator including a freely rotatable roller engageable with the exterior of the mold element for imparting vibrations to the mold element to still further pack the mix against said mold element.

12. In a machine for forming a hollow cylindrical concrete structure, the combination comprising: a rotatable hollow cylindrical mold element adapted to receive a substantially dry concrete mix; means for supporting and imparting spinning movement to said mold element at a speed sufficiently high to distribute and pack the concrete mix against the mold element by centrifugal force; a roller element extending longitudinally into the interior of said mold element; means including fluid pressure operated cylinder means for moving said roller element into engagement with the concrete mix and for applying positive pressure to the mix through said roller element to further pack the mix against said mold element while said mold element is spinning; a high frequency vibrator including a freely rotatable vibrating roller effective upon said mold element to vibrate the mold element to still further pack the mix against said mold element; and means for moving the vibrating roller into contact with the exterior of the mold element and for maintaining said vibrating roller in operative relation with said mold element.

13. The method of forming a hollow cylindrical concrete structure from a substantially dry concrete mix, comprising the steps of: introducing a substantially dry concrete mix into a hollow cylindrical mold; spinning the mold at a speed sufficiently high to distribute and pack the concrete against the mold by centrifugal force, and contacting a portion of the cylindrical mold with a vibrator movable in a fixed plane transverse to the axis of rotation of the mold to impart high frequency vibrations to the mold to further pack the concrete mix against the mold while said mold is spinning.

14. The method of forming a hollow cylindrical concrete structure from a substantially dry concrete mix, comprising the steps of: introducing a substantially dry concrete mix into a hollow cylindrical mold; spinning the mold at a speed sufficiently high to distribute and pack the concrete mix against said mold by centrifugal force; and simultaneously imparting high frequency vibrations to the mold at a given position relative to the rotating axis of the mold so that the vibrations are progressively applied to successive areas of the exterior surface of said mold around the entire circumference of the mold to further pack the concrete mix against said mold by said vibrations while the mold is spinning.

15. The method of forming a hollow cylindrical concrete structure from a substantially dry concrete mix, comprising the steps of: introducing a substantially dry concrete mix into a hollow cylindrical mold; spinning the mold at a speed sufficiently high to distribute and pack the concrete mix against said mold by centrifugal force; applying positive pressure to the concrete mix in the mold while continuing the introduction of the mix into the mold to pack the same tightly against said mold while the mix is subjected to said centrifugal force; and simultaneously imparting high frequency vibrations to the mold at a given fixed position relative to the rotating axis of the mold so that the vibrations are progressively applied to successive areas of the exterior surface of said mold around the entire circumference of the mold to further pack the concrete mix against the mold by said vibrations while the mold is spinning and while positive pressure is being applied to the concrete mix.

16. The method defined in claim 13, characterized by rotating the mold about a horizontal axis and applying the high frequency vibrations to the exterior of the mold at the lower side thereof.

17. The method of forming a hollow cylindrical concrete structure from a substantially dry concrete mix, comprising the steps of: introducing a substantially dry concrete mix into a hollow cylindrical mold; and simultaneously (1) spinning the mold about a horizontal axis at a speed sufficiently high to distribute the concrete therein by centrifugal force, (2) applying positive pressure to the concrete mix to compact the same tightly within said mold while said mix is subjected to said centrifugal force, and (3) applying high frequency vibrations to the exterior of the mold at the lower side thereof to further facilitate the compacting of the concrete mix in said mold.

18. The method of forming a hollow cylindrical concrete structure from a substantially dry concrete mix, comprising the steps of: introducing a substantially dry concrete mix into a hollow cylindrical mold; and simultaneously (1) spinning the mold about a horizontal axis at a speed sufficiently high to distribute the concrete therein by centrifugal force, (2) applying positive pressure to the concrete mix within the mold in a zone at substantially the lowest portion of the mold to compact the same tightly within said mold while said mix is subjected to said centrifugal force, and (3) applying high frequency vibrations to the mold in opposing relation to the positive pressure to further facilitate the compacting of the concrete mix in said mold.

GEORGE R. JESSEN.
CARL W. CHANLUND.

References Cited in the file of this patent

UNITED STATES PATENTS

| Number | Name | Date |
|---|---|---|
| 720,053 | McKibben | Feb. 10, 1903 |
| 1,558,067 | Watson | Oct. 20, 1925 |
| 1,750,748 | Edmunds | Mar. 18, 1930 |
| 1,751,087 | Jackson | Mar. 18, 1930 |
| 1,786,586 | Walter | Dec. 30, 1930 |
| 1,787,449 | Jackson | Jan. 6, 1931 |
| 1,867,837 | Jackson | July 19, 1932 |
| 1,868,169 | Jackson | July 19, 1932 |
| 1,873,413 | Jackson | Aug. 23, 1932 |
| 1,954,904 | Walter | Apr. 17, 1934 |
| 1,955,760 | Nichols | Apr. 24, 1934 |
| 1,988,315 | Jackson | Jan. 15, 1935 |
| 2,025,703 | Bailey, et al. | Dec. 31, 1935 |
| 2,042,395 | Halkyard | May 26, 1936 |
| 2,109,421 | Halkyard | Feb. 22, 1938 |
| 2,161,968 | Lyons et al. | June 13, 1939 |
| 2,166,175 | Porter | July 18, 1939 |
| 2,321,277 | Boyle | June 8, 1943 |

FOREIGN PATENTS

| Number | Country | Date |
|---|---|---|
| 7,417/27 | Australia | Apr. 17, 1938 |
| 102,912 | Australia | Jan. 5, 1938 |
| 137,158 | Switzerland | Mar. 1, 1930 |
| 411,283 | Great Britain | June 7, 1934 |